United States Patent
Kaiwa

(10) Patent No.: US 9,313,244 B2
(45) Date of Patent: Apr. 12, 2016

(54) CONTENT REPRODUCTION APPARATUS, CONTENT REPRODUCTION METHOD, AND COMPUTER-READABLE RECORDING MEDIUM HAVING CONTENT REPRODUCTION PROGRAM RECORDED THEREON

(71) Applicant: JVC KENWOOD Corporation, Yokohama-shi, Kanagawa (JP)

(72) Inventor: Toru Kaiwa, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 242 days.

(21) Appl. No.: 14/026,179

(22) Filed: Sep. 13, 2013

(65) Prior Publication Data

US 2014/0075044 A1     Mar. 13, 2014

(30) Foreign Application Priority Data

Sep. 13, 2012   (JP) ................... 2012-201412

(51) Int. Cl.
*H04N 21/43*     (2011.01)
*H04L 29/06*     (2006.01)
*H04N 21/433*    (2011.01)
*H04N 21/458*    (2011.01)
*H04N 21/81*     (2011.01)

(52) U.S. Cl.
CPC ............ *H04L 65/60* (2013.01); *H04L 65/4084* (2013.01); *H04N 21/4331* (2013.01); *H04N 21/458* (2013.01); *H04N 21/8113* (2013.01)

(58) Field of Classification Search
USPC ............................... 709/231, 234
See application file for complete search history.

(56) References Cited

U.S. PATENT DOCUMENTS

| | | | |
|---|---|---|---|
| 2007/0112973 A1* | 5/2007 | Harris | H04L 29/06027 709/232 |
| 2010/0115123 A1* | 5/2010 | Airamo | H04H 20/40 709/234 |
| 2010/0169502 A1* | 7/2010 | Knowlson | H04L 67/2847 709/231 |
| 2011/0023076 A1* | 1/2011 | Park | H04N 21/44209 725/116 |
| 2012/0009890 A1* | 1/2012 | Curcio | H04L 29/06 455/230 |
| 2012/0114302 A1* | 5/2012 | Randall | G11B 27/105 386/241 |
| 2012/0151539 A1* | 6/2012 | Funge | H04N 21/4307 725/109 |
| 2012/0296930 A1* | 11/2012 | Lewak | 707/769 |
| 2014/0006450 A1* | 1/2014 | Ghaskadvi | H04L 65/40 707/783 |

FOREIGN PATENT DOCUMENTS

JP    2006-201477 A    8/2006

* cited by examiner

*Primary Examiner* — Natisha Cox
(74) *Attorney, Agent, or Firm* — Nath, Goldberg & Meyer; Jerald L. Meyer; Stanley N. Protigal

(57) ABSTRACT

A content reproduction apparatus includes a communicator, a music piece acquisition controller, and a music piece reproducer. The communicator receives a content distributed in a streaming system through a telecommunications line. The music piece acquisition controller acquires data, which has not been received, of a content being reproduced through the communicator, determines advance acquisition amounts in a plurality of contents to be reproduced after the content being reproduced according to a reproduction order, and acquires a part of the plurality of contents in advance based on the determined advance acquisition amounts. The music piece reproducer reproduces the acquired contents.

7 Claims, 8 Drawing Sheets

| REPRODUCTION ORDER | TOTAL CACHE TIME | | | |
|---|---|---|---|---|
| | CF101 | CF102 | CF103 | CF104 |
| 1 | 60 | 120 | 180 | 240 |
| 2 | 40 | 100 | 160 | 220 |
| 3 | 20 | 80 | 140 | 200 |
| 4 | 0 | 60 | 120 | 180 |
| 5 | -20 | 40 | 100 | 160 |
| 6 | -40 | 20 | 80 | 140 |
| 7 | -60 | 0 | 60 | 120 |
| 8 | -80 | -20 | 40 | 100 |
| 9 | -100 | -40 | 20 | 80 |
| 10 | -120 | -60 | 0 | 60 |
| 11 | -140 | -80 | -20 | 40 |
| 12 | -160 | -100 | -40 | 20 |
| 13 | -180 | -120 | -60 | 0 |

FIG. 9

| REPRODUCTION ORDER | TOTAL CACHE TIME | | | | EVALUATION RESULT | TOTAL CACHE TIME | | | |
|---|---|---|---|---|---|---|---|---|---|
| | CF101 | CF102 | CF103 | CF104 | | CF401 | CF402 | CF403 | CF404 |
| 1 | 60 | 120 | 180 | 240 | 4 | 90 | 170 | 250 | 330 |
| 2 | 40 | 100 | 160 | 220 | 5 | 86.66667 | 186.6667 | 286.6667 | 386.6667 |
| 3 | 20 | 80 | 140 | 200 | 2 | 3.333333 | 43.33333 | 83.33333 | 123.3333 |
| 4 | 0 | 60 | 120 | 180 | 3 | 0 | 60 | 120 | 180 |
| 5 | -20 | 40 | 100 | 160 | 4 | -16.6667 | 63.33333 | 143.3333 | 223.3333 |
| 6 | -40 | 20 | 80 | 140 | 3 | -40 | 20 | 80 | 140 |
| 7 | -60 | 0 | 60 | 120 | 2 | -50 | -10 | 30 | 70 |
| 8 | -80 | -20 | 40 | 100 | 5 | -113.333 | -13.3333 | 86.66667 | 186.6667 |
| 9 | -100 | -40 | 20 | 80 | 1 | -53.3333 | -33.3333 | -13.3333 | 6.666667 |
| 10 | -120 | -60 | 0 | 60 | 3 | -120 | -60 | 0 | 60 |
| 11 | -140 | -80 | -20 | 40 | 1 | -66.6667 | -46.6667 | -26.6667 | -6.66667 |
| 12 | -160 | -100 | -40 | 20 | 4 | -203.333 | -123.333 | -43.3333 | 36.66667 |
| 13 | -180 | -120 | -60 | 0 | 4 | -230 | -150 | -70 | 10 |

CONTENT REPRODUCTION APPARATUS, CONTENT REPRODUCTION METHOD, AND COMPUTER-READABLE RECORDING MEDIUM HAVING CONTENT REPRODUCTION PROGRAM RECORDED THEREON

CROSS REFERENCE TO RELATED APPLICATION

This application claims benefit of priority under 35 U.S.C. §119 to Japanese Patent Application No. 2012-201412, filed on Sep. 13, 2012, the entire contents of which are incorporated by reference herein.

BACKGROUND

The present invention relates to a content reproduction apparatus, a content reproduction method, and a computer-readable recording medium having a content reproduction program recorded thereon that acquire and reproduce contents distributed in a streaming system.

Conventionally, as this kind of technology, there has been known one described in Japanese Patent Application Laid-Open Publication No. 2006-201477, for example. This Patent Literature describes the technology to receive music piece data of a predetermined content distributed in a streaming system, and to also previously receive and store partial data in music piece data of a content other than the music piece data of the predetermined content.

The music piece data whose partial data is previously received has a reproduction order prior to or later than that of currently receiving music piece data. Partial data is the data for a certain time in a previously set section of music piece data. For example, partial data includes six-second data from a head of each section obtained by dividing music piece data at twenty-second intervals from a head of the music piece data.

In a conventional technology, an amount of partial data acquired in advance with respect to each music piece data to be received is set to be equal to an amount of other partial data acquired in advance over all music piece data to be received. Therefore, user convenience has not been always good.

SUMMARY

An object of the present invention is to provide a content reproduction apparatus, a content reproduction method, and a computer-readable recording medium having a content reproduction program recorded thereon that can increase an advance acquisition amount in a content with a higher possibility of being reproduced next to currently reproducing content.

According to one aspect of the present invention, there is provided a content reproduction apparatus including: a communicator that receives a content distributed in a streaming system through a telecommunications line; a content acquisition controller that acquires data, which has not been received, of a content being reproduced through the communicator, determines advance acquisition amounts in a plurality of contents to be reproduced after the content being reproduced according to a reproduction order, and acquires a part of the plurality of contents in advance based on the determined advance acquisition amounts; and a reproducer that reproduces the acquired contents.

According to one aspect of the present invention, there is provided a content reproduction method including: receiving a content distributed in a streaming system through a telecommunications line; acquiring data, which has not been received, of a content being reproduced, and determining advance acquisition amounts in a plurality of contents to be reproduced after the content being reproduced according to a reproduction order; acquiring a part of the plurality of contents in advance based on the determined advance acquisition amounts; and reproducing the acquired contents.

According to one aspect of the present invention, there is provided a computer-readable recording medium having a content reproduction program recorded thereon, the program causing a computer to execute: receiving a content distributed in a streaming system through a telecommunications line; acquiring data, which has not been received, of a content being reproduced, and determining advance acquisition amounts in a plurality of contents to be reproduced after the content being reproduced according to a reproduction order; acquiring a part of the plurality of contents in advance based on the determined advance acquisition amounts; and reproducing the acquired contents.

According to the content reproduction apparatus, the content reproduction method, and the computer-readable recording medium having the content reproduction program recorded thereon of the present invention, an advance acquisition amount can be increased in a content with a higher possibility of being reproduced next to currently reproducing content. This enhances user convenience.

BRIEF DESCRIPTION OF THE DRAWINGS

FIG. 9 is a table showing one example of a total cache time with respect to a reproduction order in the evaluation cache function shown in FIG. 8.

DETAILED DESCRIPTION

A first and a second embodiment will be described below with reference to drawings.

Each embodiment will be described using an example where a content reproduction apparatus of the present invention is applied to an apparatus that reproduces, for example, music piece data as a content. Each embodiment will be described using an example where a content reproduction method of the present invention is applied to a reproduction method performed in the apparatus that reproduces music piece data. Each embodiment will be described using an example where a computer-readable recording medium having a content reproduction program of the present invention recorded thereon is applied to a computer-readable recording medium in which a program to cause a computer, which is mounted in the apparatus that reproduces music piece data, to execute processing of reproducing music piece data, has been recorded.

It is noted that the content may be video data such as a moving image or a still image, in addition to audio data such as music piece data. In addition, each embodiment can be applied also to other various contents.

First Embodiment

Figure 1:
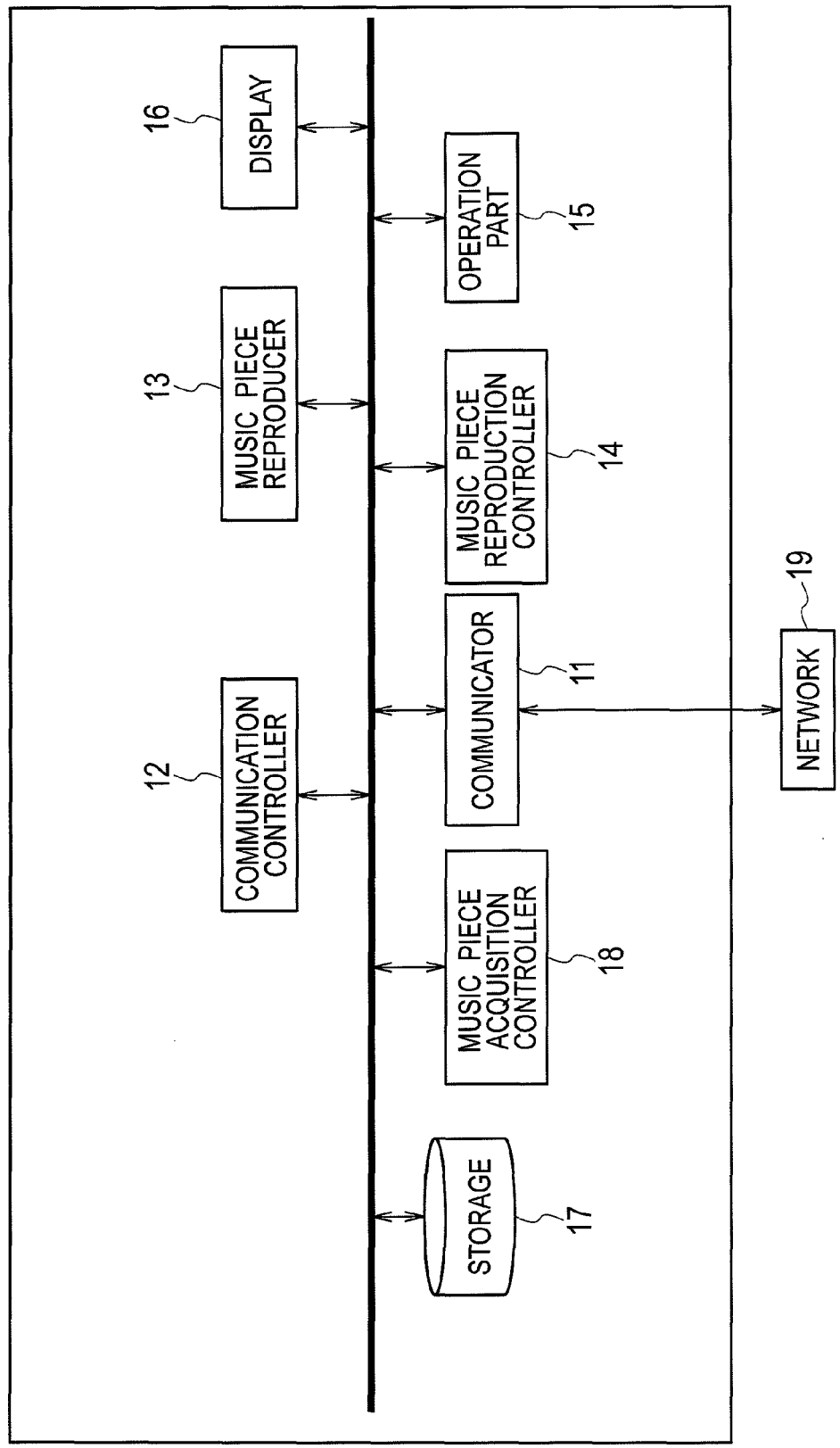
FIG. 1 is a diagram showing a configuration of a content reproduction apparatus according to a first embodiment of the present invention.

With reference to FIG. 1, will be described a configuration of a content reproduction apparatus according to a first embodiment of the present invention. In FIG. 1, the content reproduction apparatus can be configured with a portable terminal such as an audio player including a music reproduction function. Alternatively, the content reproduction apparatus can be configured with a stationary audio reproduction device or a stationary PC (personal computer) including a music reproduction function.

The content reproduction apparatus includes a communicator 11, a communication controller 12, a music piece reproducer 13, a music piece reproduction controller 14, an operation part 15, a display 16, a storage 17, and a music piece acquisition controller 18.

The communicator 11 communicates with an external device (illustration is omitted) such as a server, through a network 19 of a wired or wireless telecommunications line under control of the communication controller 12. For example, the communicator 11 communicates with an external device using communication based on a WiFi (wireless fidelity) standard (WiFi is a registered trademark), a Bluetooth (registered trademark) standard, or the like.

The communicator 11 receives and acquires music piece data distributed in a streaming system from the external device through the network 19. Here, in parallel with reception of music piece data, the streaming system is the system that enables reproduction of the received music piece data.

When a reproduction order list is stored in a predetermined server on the network 19, the communicator 11 receives and acquires the reproduction order list prior to reproduction of music piece data. Here, the reproduction order list is the list indicating a reproduction order of a series of music piece data to be reproduced. The reproduction order list is, for example, a music title list of an album, or a list such as a play list created by a user selecting music pieces. The reproduction order list may be stored in the storage 17 instead of the predetermined server on the network 19.

In parallel with receiving and acquiring music piece data being reproduced, the communicator 11 receives and caches music piece data to be reproduced after the music piece data being reproduced. Here, caching is operation to acquire music piece data to be reproduced after the music piece data being reproduced in advance of reproduction, and to temporarily store it.

The communicator 11 performs communication for achieving various functions included in the content reproduction apparatus in addition to a music reproduction function.

The communication controller 12, for example, adjusts and guarantees respective communication bands so that qualities of respective communications that the communicator 11 performs are assured. The communication controller 12 adjusts and guarantees the communication bands according to a transfer rate of music piece data to be distributed, and a communication band that the communicator 11 provides.

The music piece reproducer 13 includes an amplifier and a speaker (not shown) needed to reproduce music piece data, outputs from the speaker sound based on music piece data received under control of the music piece reproduction controller 14, and reproduces it. Alternatively, the music piece reproducer 13 outputs the sound based on the music piece data from headphones or earphones that are connected to a connection terminal of the reproduction apparatus, and reproduces it.

In parallel with receiving music piece data in the streaming system, the music piece reproduction controller 14 controls operation to reproduce the received music piece data in the music piece reproducer 13. The music piece reproduction controller 14 controls reproduction of music piece data according to various reproduction functions such as pause, fast-forward, rewind, skip to a next music piece, return to a previous music piece, cue, and shuffle play, of a music piece to be reproduced. The music piece reproduction controller 14 performs control to adjust volume, sound quality, and the like of a music piece to be reproduced.

To the operation part 15, input are various operations relevant to communication performed by the communicator 11, and reproduction of music piece data performed by the music piece reproducer 13. For example, operation of receiving music piece data and instructing reproduction start, operation of instructing shuffle play in which music pieces are reproduced at random, and the like are input to the operation part 15 by the user. The operation part 15 may be configured with a touch panel in which input operation can be performed by touching on display of a screen.

The display 16 is, for example, configured with a liquid crystal panel or the like, and performs display relevant to the communication performed by the communicator 11, and to the reproduction of music piece data performed by the music piece reproducer 13. The display 16 displays information on the communication being performed in the communicator 11, and a title of a music piece being reproduced or waiting for being reproduced.

The storage 17 is configured with an as-necessary basis access type storage device, for example, such as an HDD (hard disk drive) or a flash memory. It is noted that the storage 17 may be a memory in which data is temporarily stored. The storage 17 stores acquired music piece data. In addition, the storage 17 stores a program that is needed for causing a computer to realize operation including reproducing operation of music piece data and acquisition operation of the music piece data, the operation being performed in the apparatus. The storage 17 stores a content reproduction program of the present invention.

The music piece acquisition controller 18 controls operation to receive and acquire music piece data through the communicator 11. In parallel with receiving and acquiring music piece data through the communicator 11, the music piece acquisition controller 18 controls operation to cache a plurality of pieces of music piece data to be reproduced after the received music piece data being reproduced.

The music piece acquisition controller 18 determines advance acquisition amounts of the plurality of pieces of music piece data to be cached according to a reproduction order. Namely, the music piece acquisition controller 18 acquires music piece data to be reproduced after the music piece data being reproduced, and stores it in the storage 17 so that an advance acquisition amount is increased in music piece data with an earlier reproduction order among the plurality of pieces of music piece data to be reproduced after the music piece data being reproduced. Note that in music piece data to be reproduced after currently reproducing music piece data, it can be said that the closer to the currently reproducing music piece data the reproduction order is, the earlier reproduction order the music piece data has.

The music piece acquisition controller 18 performs operation to acquire music piece data in advance for each music piece data at a plurality of times, and gradually increases an advance acquisition amount of each content. Details of this operation will be described later.

The advance acquisition amount is set according to a distributed file format as a time when music piece data is reproduced, or a data amount for a period of time during which the music piece data is reproduced.

The content reproduction apparatus of the first and second embodiments can be achieved by a computer that controls various pieces of operation processing based on a program. This computer includes resources such as a CPU, a storage device, and an input/output device. Operation given from the operation part 15 is input to the content reproduction apparatus, which executes a procedure shown in FIG. 2 or 10 according to the input operation and a content reproduction program previously held in the storage 17. As a result of this, the content reproduction apparatus performs reproduction of music piece data and caching operation of music piece data, which will be described below. Accordingly, a function that each part included in the content reproduction apparatus has is achieved by the specific content reproduction apparatus in which a software and a hardware resource cooperate with each other.

Figure 2:
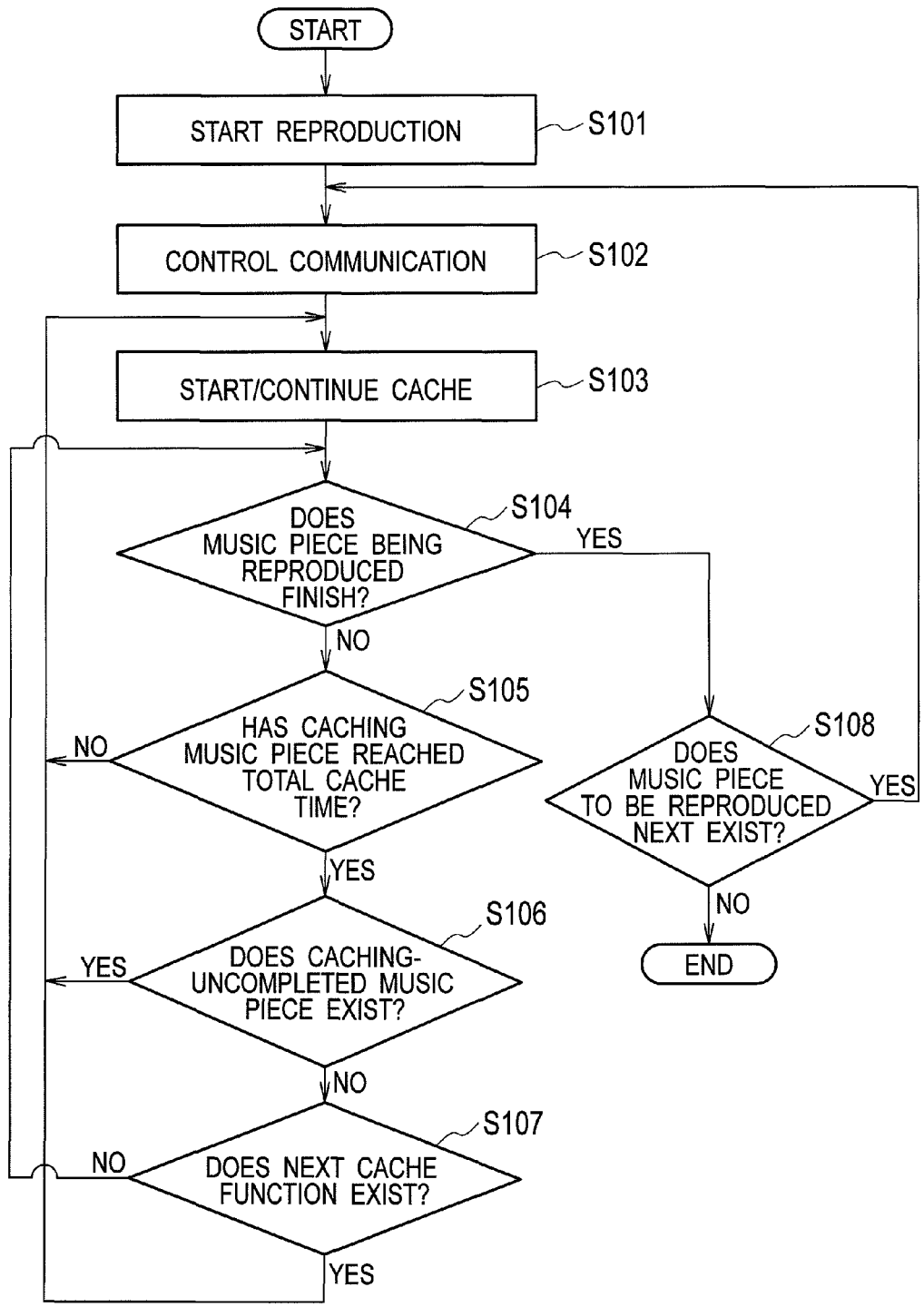
FIG. 2 is a flow chart showing an operation procedure of content reproduction according to the first embodiment of the present invention.

Next, with reference to FIG. 2, will be described operation of the content reproduction apparatus in the first embodiment. It is noted that an example will be described where an advance acquisition amount is set as a period of time (cache time) during which music piece data is reproduced. In FIG. 2, first, in step S101, an instruction to receive and acquire a reproduction order list of music piece data from the network 19 is given by a user through the operation part 15. Subsequently, when the reproduction order list is acquired, the reproduction order list is operated by the user through the operation part 15, and an instruction to reproduce music piece data according to a reproduction order indicated in the reproduction order list is given. As a result of this, the music piece reproducer 13 starts reproduction of the music piece data under control of the music piece reproduction controller 14.

At this time, the music piece reproduction controller 14 determines whether or not random reproduction of music pieces such as shuffle play, is instructed. When the shuffle play is instructed, the music piece reproduction controller 14 starts reproduction of the music piece data after determining the order of the shuffle play. That is, when the shuffle play is instructed, the music piece reproduction controller 14 creates a reproduction order list so that a music piece reproduction order becomes random.

In step S102, the communication controller 12 sets a communication band of each communication that the apparatus performs. The communication controller 12 guarantees the communication band in which music piece data is received so that reproduction quality of a currently reproducing music piece is first assured. Next, the communication controller 12 guarantees from the remaining communication band, a communication band for caching music piece data being reproduced and for caching music piece data to be reproduced after the music piece data being reproduced. The communication controller 12 continuously monitors a communication environment, and when the communication environment changes, the communication controller 12 sequentially assures reproduction quality, and guarantees a communication band for caching. It is noted that such monitoring operation is omitted in the flow chart of FIG. 1.

In step S103, the music piece acquisition controller 18 starts caching of music piece data to be reproduced from the network 19 through the communicator 11. The music piece acquisition controller 18 performs caching in accordance with a cache function.

Figures 3, 4:
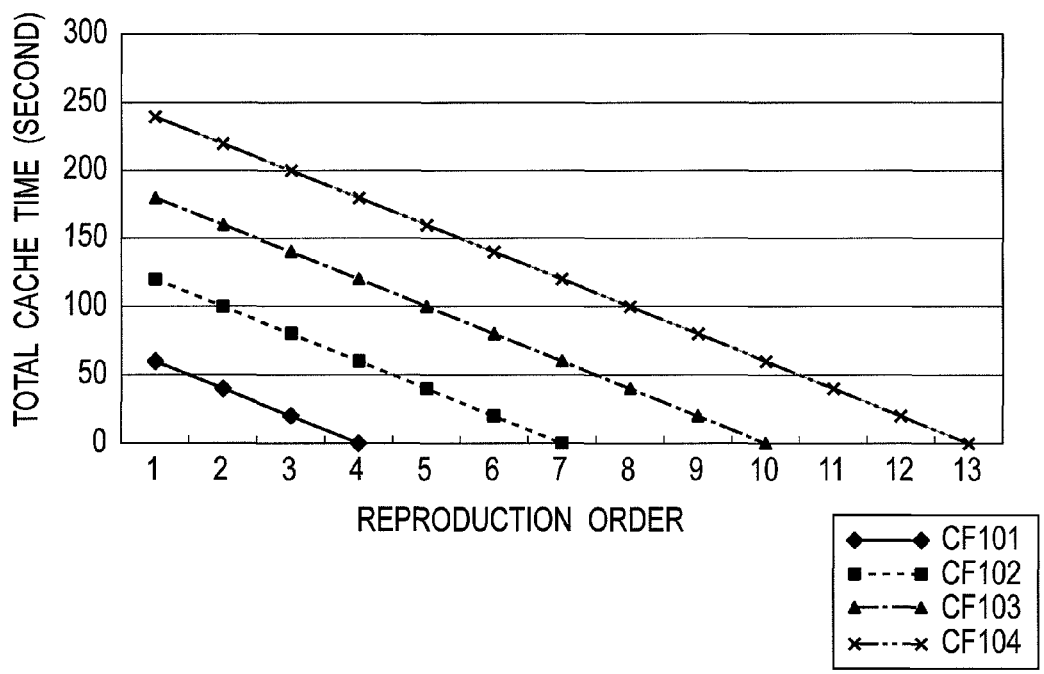
FIG. 3 is a graph showing a first example of a cache function according to the first embodiment of the present invention.
FIG. 4 is a table showing one example of a total cache time with respect to a reproduction order in the cache function shown in FIG. 3.

For example, the cache function is set as a function as shown in FIG. 3, and is previously stored to be prepared in the storage 17. The cache function is the function indicating a relationship between a relative reproduction order of music piece data after currently reproducing music piece data with respect to the currently reproducing music piece data (a horizontal axis), and a total cache time (an advance acquisition amount) (vertical axis). It is noted that a cache time is a period of time during which the music piece data is reproduced. When caching for 60 seconds of cache time is performed, the music piece can be reproduced for 60 seconds even if the music piece data is not received after the caching. If a form of music piece data is completely the same, a cache time is proportional to a cached data amount.

In FIG. 3, four cache functions CF101 to CF104 are prepared in the first embodiment. In each of the cache functions CF101 to CF104, a reproduction order and a total cache time are in a relation of a linear function with a negative slope.

For example, in a case where music piece data 0 to music piece data 13 are reproduced in the order of the music piece data 0 to the music piece data 13, when the music piece data 0 is reproduced, the reproduction order of the music piece data 1 is the first, and the reproduction order of the music piece data 2 to the music piece data 13 is the second to the thirteenth. Next, when reproduction of the music piece data 0 is finished, and the music piece data 1 is reproduced, the reproduction order of the music piece data 2 advances to the first, and the reproduction order of the music piece data 3 to the music piece data 13 advances to the second to the twelfth, respectively.

Each of the cache functions CF101 to CF104 is one example in the case of reproducing the music piece data 0 to the music piece data 13 in the order of the music piece data 0 to the music piece data 13, and specific numerical values of the reproduction order and the total cache time are, for example, prescribed as shown in FIG. 4. The total cache time in each of the cache functions CF101 to CF104 indicates an upper-limit value of a cache time. For example, a total cache time of the music piece data having the first reproduction order is 60 seconds in the cache function CF101, and it is 120 seconds in the cache function CF102.

If the same music piece data is being reproduced, the cache functions CF101 to CF104 are used in the order of the cache functions CF101 to CF104. When music piece data to be reproduced is changed, the cache functions CF101 to CF104 are newly used in the order from the cache function CF101 regardless of the cache functions CF101 to CF104 used before the music piece data to be reproduced is changed.

In step S103, the music piece acquisition controller 18 first starts caching of music piece data to be reproduced next to the currently reproducing music piece data using the cache function CF101. The music piece acquisition controller 18 then caches the music piece data having the first reproduction order until the cache time reaches 60 seconds. As a result of this, after that, even though the music piece data having the first reproduction order cannot be received, the music piece acquisition controller 18 allows reproduction of the music piece data having the first reproduction order for 60 seconds. Next, the music piece acquisition controller 18 caches the music piece data having the second reproduction order until the cache time reaches 40 seconds, and next, caches the music piece data having the third reproduction order until the cache time reaches 20 seconds. The music piece acquisition controller 18 does not cache the music piece data having reproduction order after the third because the cache time is not more than 0 second. The music piece acquisition controller 18 then stores the cached music piece data in the storage 17.

In step S104, the music piece reproduction controller 14 determines whether or not reproduction of the currently reproducing music piece data has been finished. When reproduction of the music piece data is not finished, the music piece reproduction controller 14 executes processing shown in step S105. When reproduction of the music piece data is finished, the music piece reproduction controller 14 executes processing shown in step S108.

In step S105, the music piece acquisition controller 18 determines whether or not a total cache time of currently caching music piece data has reached all cache times prescribed by the cache function CF101. When the total cache time of the music piece data has not reached all the cache times prescribed by the cache function CF101, the procedure returns to previous step S103, and the music piece acquisition controller 18 continues caching. When the total cache time of the music piece data has reached all the cache times prescribed by the cache function CF101, the music piece acquisition controller 18 executes processing shown in step S106.

In step S106, the music piece acquisition controller 18 determines whether or not there is any music piece data that has not been cached until the cache time prescribed by the cache function CF101. Namely, the music piece acquisition controller 18 determines whether or not all pieces of the music piece data 1 to 3 having the first to third reproduction order have been cached.

As a result of the determination, when there is some music piece data that has not been cached, the procedure returns to previous step S103, and the music piece acquisition controller 18 starts caching of music piece data to be cached next. Meanwhile, when there is no music piece data that has not been cached, i.e., when caching of all pieces of the music piece data 1 to 3 having the first to the third reproduction order have been completed, the music piece acquisition controller 18 executes processing shown in step S107.

In step S107, the music piece acquisition controller 18 determines whether or not there is a cache function to be used next. When there is a cache function, the procedure returns to previous step S103, and the music piece acquisition controller 18 continues caching using a next cache function, i.e., the cache function CF102 here. That is, the music piece acquisition controller 18 performs caching in order until cache times of the music piece data having the first to the sixth reproduction order reach 120, 100, 80, 60, 40, and 20 seconds, respectively. Hereinafter, the same is true on the cache function CF103 and the cache function CF104.

As described above, after acquiring a plurality of pieces of music piece data in advance based on the advance acquisition amount determined based on the cache function CF101, the music piece acquisition controller 18 redetermines advance acquisition amounts of the plurality of pieces of music piece data based on the cache function CF102 so that the advance acquisition amounts of the plurality of pieces of music piece data are further increased, and subsequently, acquires the plurality of pieces of music piece data in advance again based on the redetermined advance acquisition amounts.

It is noted that although the number of pieces of music piece data acquired in advance is not necessarily increased, in the present embodiment, the number of pieces of music piece data acquired in advance based on the cache function CF102 is set to be larger than the number of pieces of music piece data acquired in advance based on the cache function CF101. Specifically, while the number of pieces of music piece data acquired in advance is three in the cache function CF101, the number of pieces of music piece data acquired in advance is set to be six in the cache function CF102.

As described above, in addition to the plurality of pieces of music piece data acquired in advance in the cache function CF101, if music piece data to be reproduced after the plurality of pieces of music piece data is also acquired in advance, user convenience can be further enhanced.

Meanwhile, when there is no cache function, i.e., when all caching using the cache functions CF101 to CF104 is completed, the music piece acquisition controller 18 executes processing shown in step S104.

Here, there will be described as one example a scene where caching is continued using the cache functions CF102 to CF104 after caching using the cache function CF101 is completed during reproduction of the music piece data 0. In this case, a total cache time of the music piece data 1 has reached 60 seconds prescribed by the cache function CF101. Meanwhile, a total cache time of the music piece data 1 prescribed by the cache function CF102 is prescribed as 120 seconds. Accordingly, in caching of the music piece data 1 using the cache function CF102, the music piece data 1 is additionally cached with a maximum of 60 seconds as the upper limit so that the total cache time is 120 seconds.

Similarly, a total cache time of the music piece data 2 has reached 40 seconds prescribed by the cache function CF101. Accordingly, in caching of the music piece data 2 using the cache function CF102, the music piece data 2 is additionally cached with a maximum of 60 seconds as the upper limit so that the total cache time is 100 seconds.

As described above, if the music piece data 0 is being reproduced, caching of music piece data is performed sequentially using the cache functions CF101 to CF104. In addition, in the present embodiment, when caching using the cache functions CF101 to CF104 is completed during reproduction of the music piece data 0, new caching is not performed until the music piece data 0 being reproduced is ended, but caching may be further performed. To what extent caching is performed can be appropriately determined according to a remaining capacity of the storage 17.

As described above, it is set so that the number of pieces of music piece data targeted to be cached is increased in the order of the cache functions CF101, CF102, CF103, and CF104, and that additionally, a cache time with respect to music piece data having the same reproduction order becomes longer. By doing this, advance acquisition amounts of respective contents can be gradually increased.

In step S108, the music piece reproduction controller 14 determines whether or not there is any music piece data to be reproduced next. Namely, the music piece reproduction controller 14 determines whether or not all the music piece data indicated in the reproduction order list has been reproduced. As a result of the determination, when there is music piece data to be reproduced, the procedure returns to processing shown in previous step S102, and the music piece reproduction controller 14 continues reproduction and caching of the music piece data.

Here, there will be described a scene as one example where reproduction of the music piece data 0 is finished and reproduction of the music piece data 1 to be reproduced next is started. For example, it is assumed that when the music piece data 1 having the first reproduction order is being cached using the cache function CF102, reproduction of the music piece data 0 was finished. In this case, the reproduction order of the music piece data 2 advances to the first from the second, and caching of the music piece data 2 is started using the cache function CF101. A total cache time of the music piece data 2 in the cache function CF101 is 60 seconds. Meanwhile, the music piece data 2 is cached until the total cache time reaches 40 seconds using the cache function CF101 during reproduction of the music piece data 0. Accordingly, when the music piece data 1 is being reproduced, the music piece data 2 is additionally cached until the total cache time reaches 60 seconds with a maximum of 20 seconds as the upper limit.

Meanwhile, as a result of the above-described determination, when there is no music piece data to be reproduced next, i.e., when all the music piece data described in the reproduction order list is reproduced, the above-described series of processing is ended. Thus, by executing the above-described series of processing, caching of the music piece data to be reproduced after the currently reproducing music piece data is performed in parallel with reproduction of the music piece data.

As described above, in the first embodiment, a total cache time of music piece data acquired in advance is determined according to the reproduction order of the music piece data in parallel with acquiring data that has not been received yet of the music piece data being reproduced. Therefore, it becomes possible to increase the total cache time of the music piece data in music piece data with the earlier reproduction order. As a result of this, even when a communication speed is not sufficient or even when a communication unit itself cannot be used temporarily, a user can continue reproduction of the music piece data for a longer period of time during which reproduction of the music piece data next to the currently reproducing music piece data is started. In addition, even when the user performs skip operation to the music piece and reproduction of next music piece data is further started, since a cash time of the music piece data is longer than that of music piece data after the next music piece data, it is possible to reproduce the next music piece data for a longer time, which effectively uses a cache of the acquired music piece data.

In addition, in the first embodiment, the total cache time of the music piece data is gradually increased, in caching the music piece data. Therefore, for example, even when a communication speed in caching the music piece data is not sufficient, it becomes possible to secure an enough time to cache a subsequent plurality of pieces of music piece data because a total cache time of one music piece is small in the beginning, which allows a plurality of pieces of music piece data to be reproduced after the currently reproducing music piece data, to be cached. As a result of this, even when the music piece to be reproduced next is skipped by user's operation and further, reproduction of the next music piece data is started, the user can start smooth streaming reproduction, which enhances user convenience.

It is noted that in the first embodiment, the cached music piece data is stored as long as a storage capacity of the storage 17 to temporarily store music piece data is not full. An upper-limit value of a total cache amount of music piece data may be specified by the user, or it may be increased or decreased according to a remaining capacity of the storage 17 under control of the music piece acquisition controller 18.

The music piece data cached and stored in the storage 17 may be deleted after reproduction of all the music piece data in the reproduction order list is finished. Meanwhile, the music piece data cached and stored in the storage 17 may be stored as long as a storage capacity to be used for a cache is not full in consideration of the user's back skip operation or the like. However, it is needless to say that a cache of music piece data before reproduction is preferentially stored over a cache of the music piece data after reproduction.

When the storage capacity of the storage 17 to be used for the cache has reached the upper limit, a cache of the reproduced music piece data is first deleted.

Figure 5:
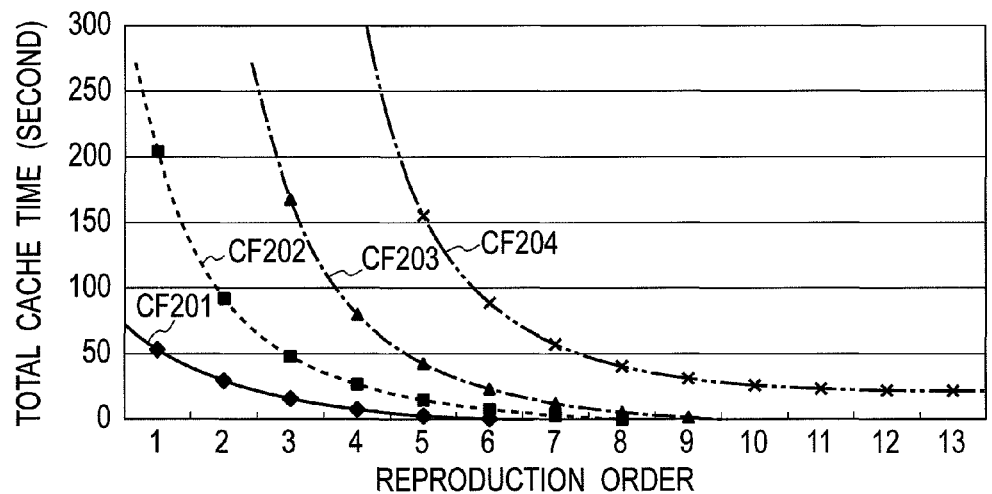
FIG. 5 is a graph showing a second example of the cache function.

In the first embodiment, although as shown in FIG. 3, a reproduction order and a total cache time are in a relation of a linear function with a negative slope in the cache function, they are not limited to this relation. For example, an arbitrary function in which a total cache time is increased in music piece data having an earlier reproduction order can be used for the cache function. For example, the reproduction order and the total cache time may be in a relation indicated by a rational function having an asymptote as shown in FIG. 5. In the cache function CF203 shown in FIG. 5, if the storage capacity to store the cache is not full, the whole music piece data having the first and the second reproduction order is cached. In the cache function CF204 shown in FIG. 5, if the storage capacity to store the cache is not full, all the music piece data in the reproduction order list is cached. That is, data relevant to all the music piece data is acquired, although partially, in advance.

Figure 6:
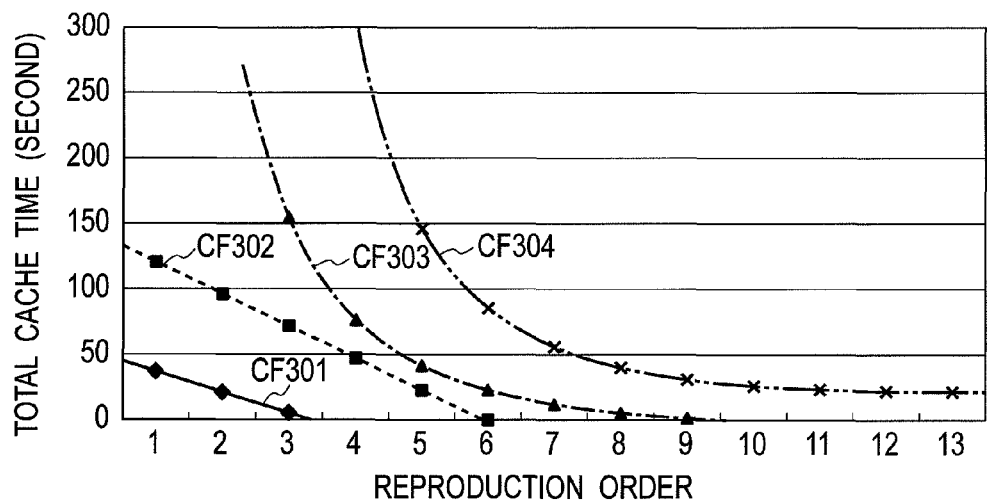
FIG. 6 is a graph showing a third example of the cache function.

Although four cache functions shown in FIGS. 3 and 5 are configured with a group of functions in which functions that similarly change are parallelly translated, they are not limited to this. The plurality of cache functions may be configured by mixing functions with different changes. For example, as shown in FIG. 6, the cache functions CF301 and CF302 can be configured with functions that change similarly to the cache functions CF101 to CF102 shown in FIG. 3. The cache functions CF303 and CF304 can be configured with functions that change similarly to the cache functions CF203 to CF204 shown in FIG. 5.

In addition, in the first embodiment, although data amount to be cached is set as the total cache time and the cache function is represented by a unit of time, a cache function represented by a unit of byte may be used because a content is data.

In a prior art, for example, in a case where a problem occurs in the communication environment and content data cannot be received temporarily, under a state where acquisition of partial data with a predetermined data amount is completed in one or more contents to be reproduced next, when listening to a currently reproducing content is completed and reproduction of a next content is started, only a section from a head to an acquired portion of the content can be reproduced irrelevant to a reproduction order of the content. Therefore, the partial data of the content to be reproduced subsequently had low convenience for the user. In addition, in the prior art, the partial data of a plurality of contents to be acquired in advance is cached by a predetermined data amount. However, when a communication speed was not sufficient, the partial data of contents having a higher reproduction order only was acquired, and it was not necessarily possible to acquire the partial data of the plurality of contents. In contrast with this, according to the content reproduction apparatus of the present embodiment, since the advance acquisition amounts of the plurality of contents are determined according to the reproduction order, an advance acquisition amount can be increased in a content with a higher possibility of being reproduced next to the currently reproducing content, and user convenience can be enhanced.

Second Embodiment

Figure 7:
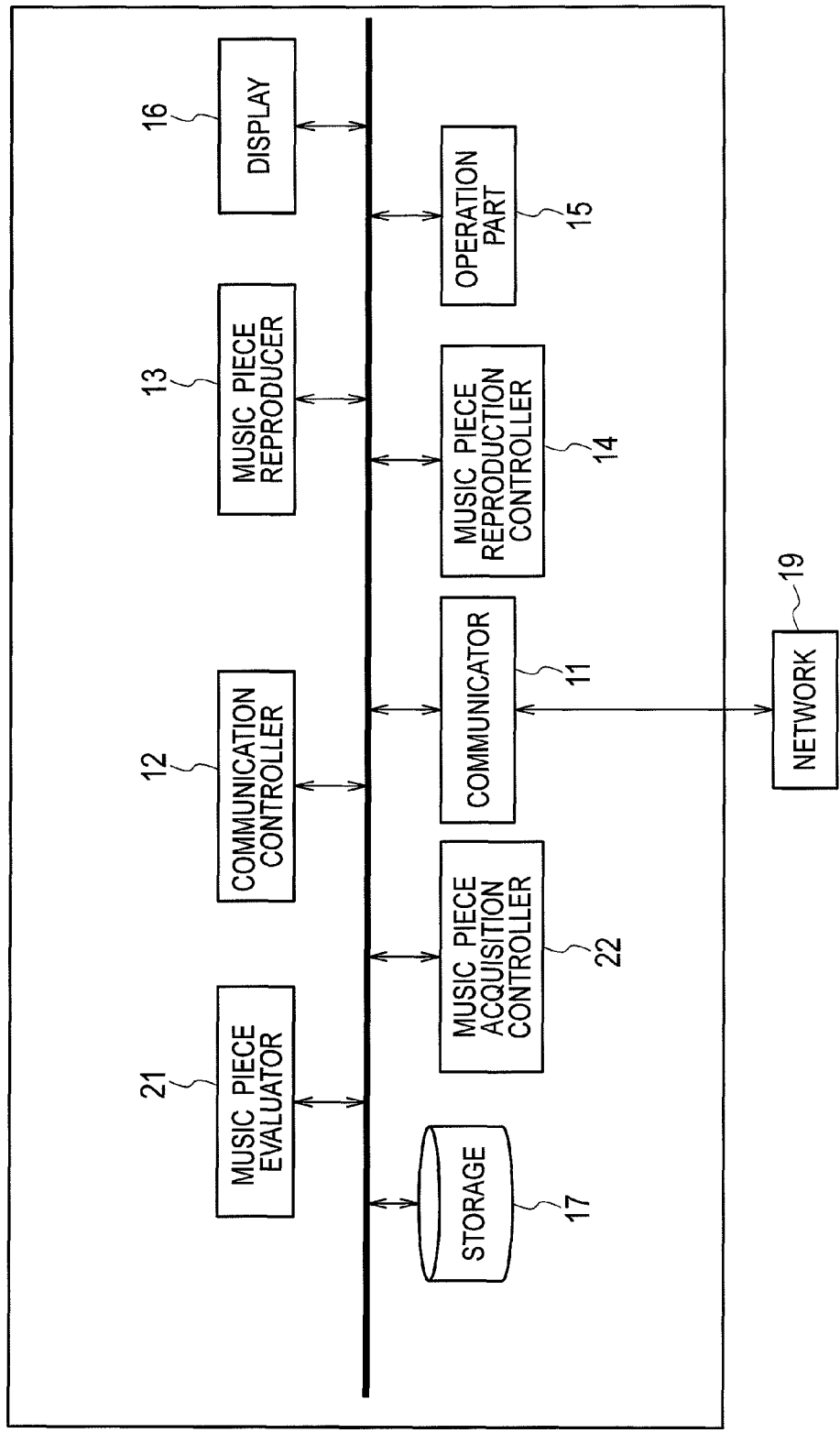
FIG. 7 is a diagram showing a configuration of a content reproduction apparatus according to a second embodiment of the present invention.

With reference to FIG. 7, will be described a configuration of a content reproduction apparatus according to a second embodiment of the present invention. In FIG. 7, the content reproduction apparatus is the one in which a music piece evaluator 21 is added to the content reproduction apparatus shown in FIG. 1, and includes a new music piece acquisition controller 22 instead of the music piece acquisition controller 18. Other components are similar to the components of the content reproduction apparatus of the first embodiment. It is noted that, in the configuration shown in FIG. 7, the same symbols are attached to a configuration similar to the configuration shown in FIG. 1, and that explanation thereof is omitted.

In FIG. 7, the music piece evaluator 21 creates an evaluation result that evaluates a user's preference to music piece data. The music piece evaluator 21 creates the evaluation result by scoring the evaluation result, for example, into five grades (1 to 5). In this case, it is assumed that the larger a score is, the higher the evaluation result is. That is, it can also be said that a music piece having a larger score has a high possibility of matching user's preference.

The evaluation result can be created according to information that the user directly inputs through the operation part 15. Alternatively, the music piece evaluator 21 can create the evaluation result according to information such as a reproduction frequency and a skip reproduction frequency of music piece data. The information with which the evaluation result such as the reproduction frequency and the skip frequency of the music piece data, is created is acquired by the music piece reproduction controller 14, is stored in the storage 17, and is read by the music piece evaluator 21 if needed. In addition, the evaluation result may be acquired from an external server.

The music piece acquisition controller 22 creates evaluation cache functions CF401 to CF404 reflecting an evaluation result according to the evaluation result created by the music piece evaluator 21. The music piece acquisition controller 22 creates the evaluation cache functions CF401 to CF404 using a reference cache function. For example, the cache functions CF101 to CF104 shown in FIG. 3 can be used for the reference cache function.

The music piece acquisition controller 22 corrects the reference cache functions CF101 to CF104 which are created according to the reproduction order, based on the evaluation result, creates an evaluation cache function, and determines a total cache time. The music piece acquisition controller functions similarly to the music piece acquisition controller 18 of the first embodiment except for creating the evaluation cache functions CF401 to CF404 and caching music piece data.

For example, a total cache time of each of the evaluation cache functions CF401 to CF404 is calculated by the following expression (1).

"total cache time of evaluation cache function"="total cache time of reference cache function"×"evaluation result"/3+{10×("evaluation result"−3)}  (1)

In the above expression (1), as describe above, the evaluation result is a numerical value of five-grade scores 1 to 5, for example.

Figure 8:
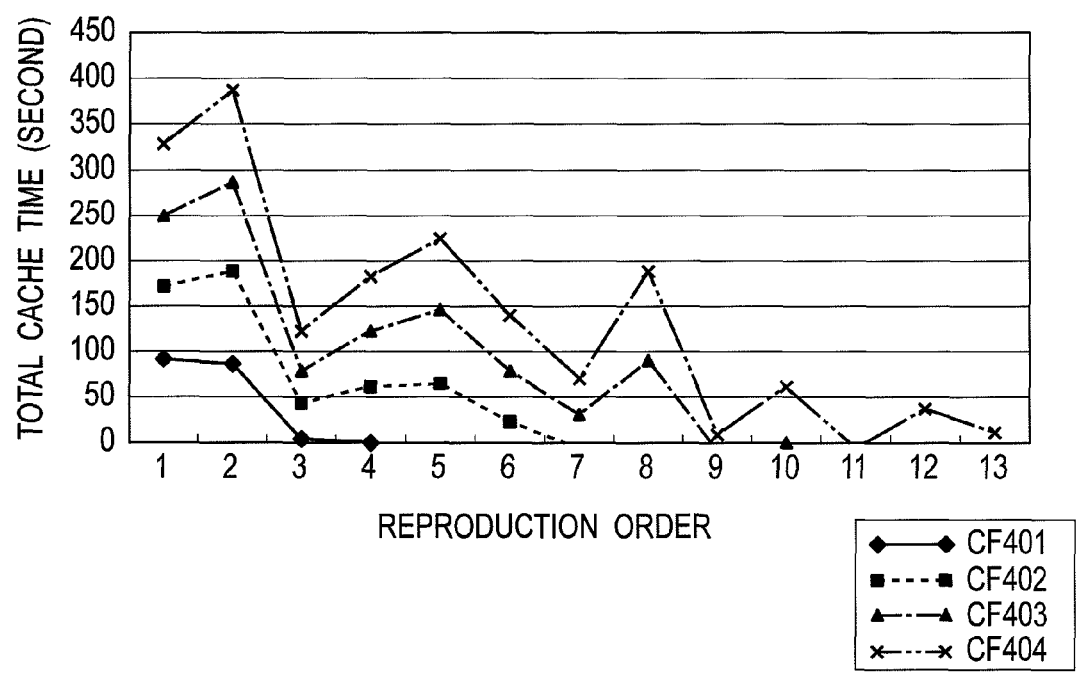
FIG. 8 is a graph showing one example of an evaluation cache function according to the second embodiment of the present invention.

One example of the evaluation cache functions CF401 to CF404 is shown in FIG. 8. In FIG. 9, shown is one example of numerical values of the total cache times of the evaluation cache functions CF401 to CF404 that are calculated by the above expression (1), and the evaluation results. It is noted that in FIG. 9, a total cache time having a negative value (a value to which "−" is attached) indicates that caching is not performed.

Figure 10:
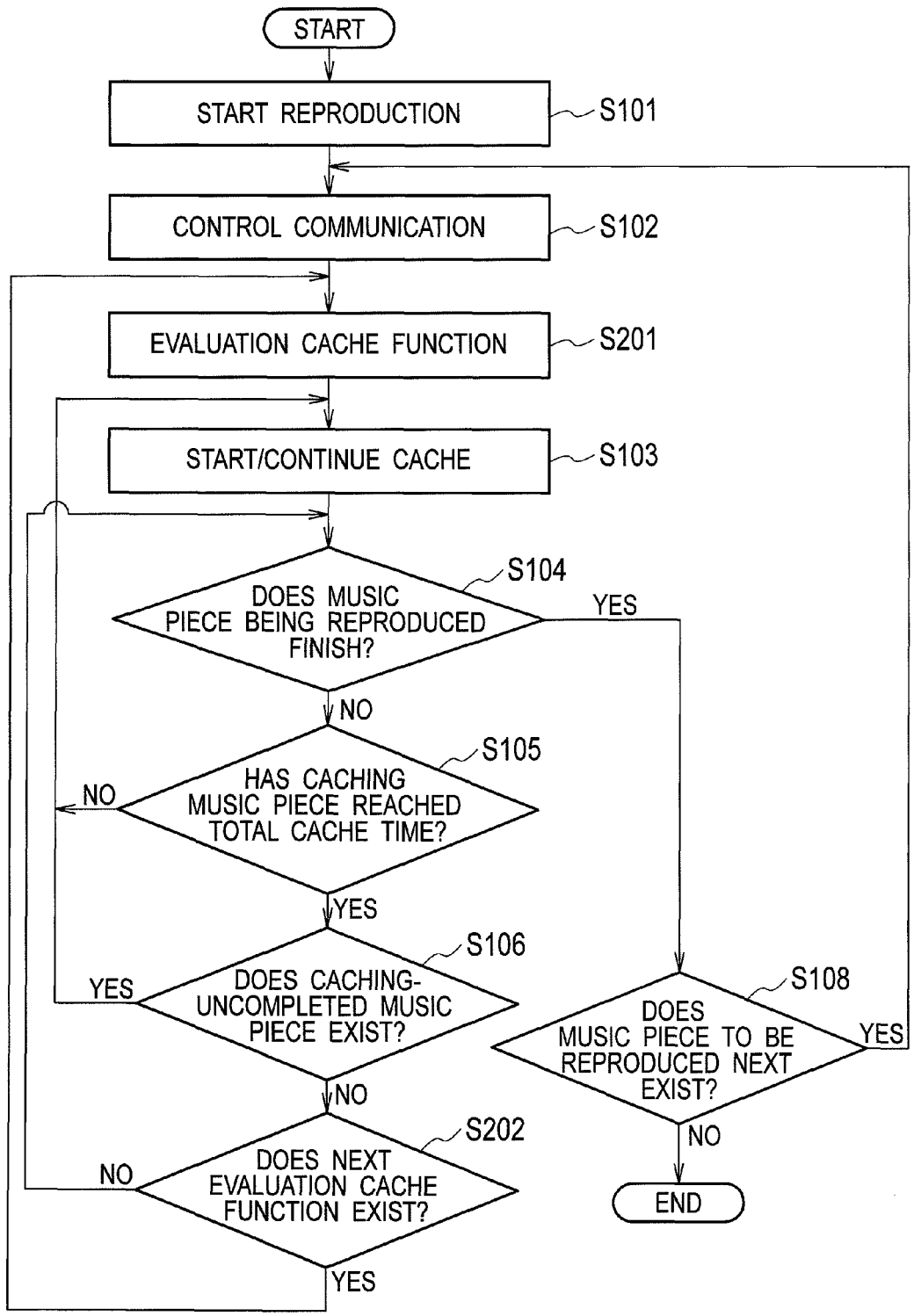
FIG. 10 is a flow chart showing an operation procedure of content reproduction according to the second embodiment of the present invention.

Next, with reference to FIG. 10, will be described operation of the content reproduction apparatus in the second embodiment. In FIG. 10, points different from FIG. 2 are as follows: (i) processing shown in step S201 is executed between steps S102 and S103; and (ii) processing shown in step S202 is executed instead of step S107. Since other processing is similar to the processing shown in FIG. 2, the same symbols are attached, and explanation of the processing is omitted.

In step S201, the music piece acquisition controller 22 creates the evaluation cache functions CF401 to CF404 according to the evaluation result created by the music piece evaluator 21, and determines a total cache time.

After that, processing shown in step S103 of FIG. 2 is executed, caching of the music piece data is started using the evaluation cache functions CF401 to CF404. After processing shown in step S106 is ended, it is determined in step S107 whether or not there are cache functions CF101 to CF104 to be used next. In contrast with this, in step S202, it is determined whether or not there are evaluation cache functions CF401 to CF404 instead of the cache functions CF104 to CF104.

Thus, a series of processing shown in FIG. 10 is executed, and thereby caching of music piece data is performed similarly to the first embodiment.

As described above, in the second embodiment, while the evaluation result indicating user's preference is reflected, the total cache time of the music piece data is determined. The music piece data having a high numerical value of the evaluation result has a high possibility of matching the user preference, skip operation or stop operation during reproduction of the music piece data is not performed, and the music piece data has a high possibility of being reproduced and listened to from the start to the end thereof. Accordingly, according to the second embodiment, it becomes possible to increase a total cache time of the music piece matching the user's preference, the music piece being reproduced and listened to from the start to the end of the music piece data. Even when a communication speed is not sufficient or even when a communication unit itself cannot be used temporarily, the user can continue to reproduce and listen to the music piece data for a longer time in the music piece data matching user's preference when reproduction of the music piece data next to the currently reproducing music piece data is started.

In addition, since music piece data having a low evaluation result of not matching the user's preference has a high possibility that the user performs skip operation to the music piece, the total cache time is previously reduced, and thereby the storage capacity used for the cache can be effectively utilized.

It is noted that in the second embodiment, when shuffle play is performed, a reproduction order of music piece data at the time of shuffle play may be changed so that the music piece data is reproduced in the order of having a longer total cache time.

In addition, the above-described evaluation cache functions, reference cache function, and relation (five-grade evaluation) of the evaluation result are one example, and the present invention is not limited to these. For example, the evaluation result may be a rational number, the function may be expressed as a higher-order function, or may be expressed by an arbitrary function in which a cache amount is increased in a music piece having an earlier reproduction order and a higher evaluation result.

A content reproduction program of the present invention may be provided in a state of being recorded on a recording medium, and the content reproduction program may be distributed through a telecommunications line such as the Internet. The content reproduction program recorded on the recording medium, and the content reproduction program distributed through the telecommunications line may be stored in the content reproduction apparatus and may cause the content reproduction apparatus to execute the above-described content reproduction method.

What is claimed is:

1. A content reproduction apparatus comprising:
   circuitry that;
   receives a content distributed in a streaming system through a telecommunications line,
   acquires data, which has not been received, of a content being reproduced,
   determines advance acquisition amounts in a plurality of contents to be reproduced after the content being reproduced according to a reproduction order,
   acquires a part of the plurality of contents in advance based on the determined advance acquisition amounts, and reproduces the acquired contents,
   wherein after acquiring the part of the plurality of contents in advance based on the determined advance acquisition amounts, the circuitry redetermines advance acquisition amounts in the plurality of contents so as to increase the advance acquisition amounts in the plurality of contents, and sequentially acquires another part of the plurality of contents in advance based on the redetermined advance acquisition amounts.

2. The content reproduction apparatus according to claim 1, wherein the circuitry determines an advance acquisition amount so as to increase the advance acquisition amount in a content, which has a higher reproduction order, of the plurality of contents.

3. The content reproduction apparatus according to claim 1, wherein the circuitry determines an advance acquisition amount in a content to be reproduced after the plurality of contents according to a reproduction order, and acquires in advance a part of the content to be reproduced after the plurality of contents based on the determined advance acquisition amount.

4. The content reproduction apparatus according to claim 1, wherein the circuitry corrects the advance acquisition amounts in the plurality of contents according to evaluation results that evaluate user's preference to the contents.

5. The content reproduction apparatus according to claim 4, wherein the circuitry corrects the advance acquisition amounts in the plurality of contents so as to increase the advance acquisition amount in the content having the higher evaluation result.

6. A content reproduction method comprising:
   receiving a content distributed in a streaming system through a telecommunications line;
   acquiring data, which has not been received, of a content being reproduced, and determining advance acquisition amounts in a plurality of contents to be reproduced after the content being reproduced according to a reproduction order;
   acquiring a part of the plurality of contents in advance based on the determined advance acquisition amounts;
   redetermining advance acquisition amounts in the plurality of contents so as to increase the advance acquisition amounts in the plurality of contents after acquiring the part of the plurality of contents in advance based on the determined advance acquisition amounts;
   sequentially acquiring another part of the plurality of contents in advance based on the redetermined advance acquisition amounts; and
   reproducing the acquired contents.

7. A computer-readable recording medium having a content reproduction program recorded thereon, the program causing a computer to execute:
   receiving a content distributed in a streaming system through a telecommunications line;
   acquiring data, which has not been received, of a content being reproduced, and determining advance acquisition amounts in a plurality of contents to be reproduced after the content being reproduced according to a reproduction order;
   acquiring a part of the plurality of contents in advance based on the determined advance acquisition amounts;
   redetermining advance acquisition amounts in the plurality of contents so as to increase the advance acquisition amounts in the plurality of contents after acquiring the part of the plurality of contents in advance based on the determined advance acquisition amounts;
   sequentially acquiring another part of the plurality of contents in advance based on the redetermined advance acquisition amounts; and
   reproducing the acquired contents.

* * * * *